(No Model.) 2 Sheets—Sheet 1.
H. H. BRAKELEY.
MACHINE FOR HULLING PEAS OR BEANS.

No. 553,774. Patented Jan. 28, 1896.

Witnesses
Ernest E. Hafer
Fred. C. Benner

Inventor:
Harry H. Brakeley
by his Attorneys
Howson & Howson (No Model.) 2 Sheets—Sheet 2.

H. H. BRAKELEY.
MACHINE FOR HULLING PEAS OR BEANS.

No. 553,774. Patented Jan. 28, 1896.

Witnesses
Ernest E. Hafen
Fred C. Benner

Inventor:
Harry H. Brakeley
by his Attorneys
Howson & Howson

UNITED STATES PATENT OFFICE.

HARRY H. BRAKELEY, OF BORDENTOWN, NEW JERSEY.

MACHINE FOR HULLING PEAS OR BEANS.

SPECIFICATION forming part of Letters Patent No. 553,774, dated January 28, 1896.

Application filed July 18, 1895. Serial No. 556,389. (No model.)

*To all whom it may concern:*

Be it known that I, HARRY H. BRAKELEY, a citizen of the United States, and a resident of Bordentown, New Jersey, have invented certain Improvements in Machines for Hulling Peas or Beans, of which the following is a specification.

My invention relates to that class of machines intended for hulling green peas, beans, or the like, in which the peas or beans are subjected to the action of the machine while still upon the vines or a portion thereof, such machine comprising essentially an outer rotating drum with inwardly-projecting blades and an internal beater consisting of a drum with blades projecting therefrom, said beater-drum being driven in the same direction as the outer drum but at a much higher speed.

One object of my present invention is to so construct the outer drum that portions of its perforated casing can be removed and replaced without disturbing the other portions, a further object being to provide for the effective separation of the hulled peas or beans from the chaff, and a still further object being to prevent entanglement of the vines and refuse with the shaft of the central beater without the necessity of extending said beater beyond the outer drum. These objects I attain in the manner hereinafter set forth, reference being had to the accompanying drawings, in which—

Figure 1:
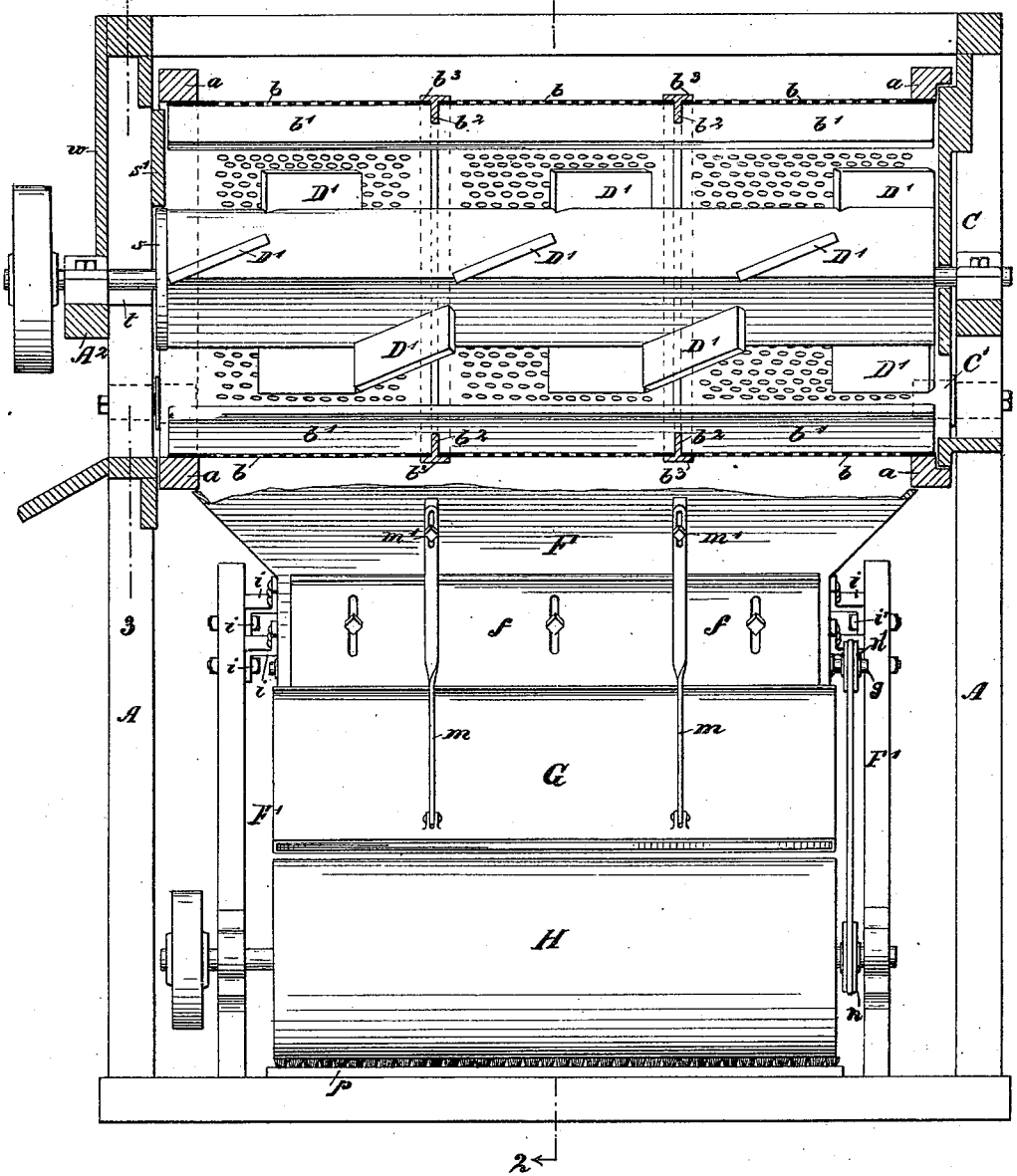
Figure 2:
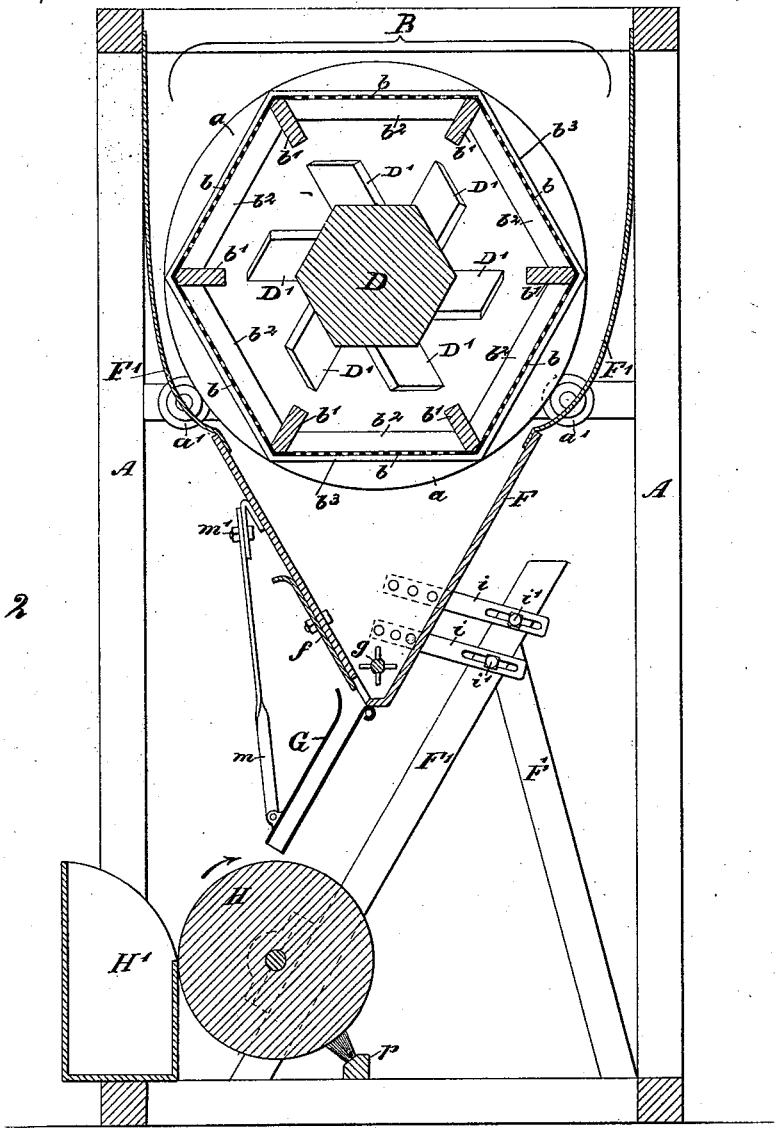
Figure 3:
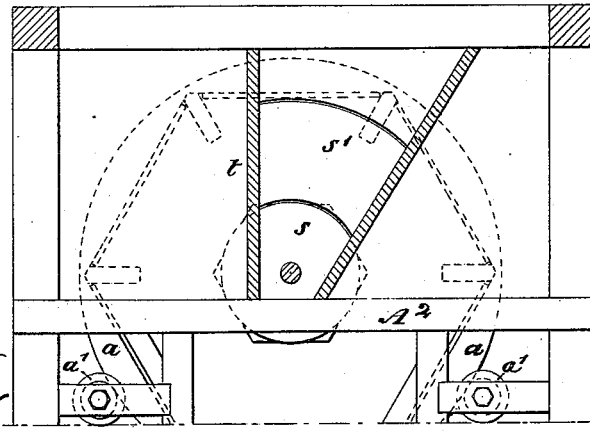

Figure 1 is a longitudinal section of a machine constructed in accordance with my invention for hulling and separating green peas or beans with the vines or a portion thereof attached. Fig. 2 is a transverse section of the same on the line 2 2, Fig. 1; and Fig. 3 is a transverse section on the line 3 3, Fig. 1.

In Figs. 1 and 2, A represents the fixed framework of the machine having rollers $a'$ for the support of the end bars $a$ of a drum B, which is preferably of polygonal form in cross-section and is composed of perforated or open-work panels $b$ with inwardly-projecting blades $b'$ at the angles. This drum may be rotated in any of the ways common in machines of this class.

One end of the drum is adapted for the reception of a head C secured to one of the fixed frames A and having an opening $c'$ through which the vines with the peas or beans thereon are fed into the drum, the opposite end of the drum being open in part for the discharge of the vines and empty pods, the peas or beans which escape from the pods during the passage of the vines through the drum passing through the perforated panels of the latter and being separated from the chaff in the manner described hereinafter.

Within the drum B is a beater consisting of a central drum D with projecting blades $D'$ which are preferably inclined slightly so as to impart a forward feed to the mass subjected to the action of the beater.

The drum has at each end a projecting shaft adapted to bearings on the fixed frame of the machine, the shaft having at one end a pulley for the reception of a belt whereby the drum D may be driven in the same direction as the drum B but at higher speed.

So far as described, the machine is similar to others now in use; but in the ordinary machine the perforated panels $b$ extend from end to end of the drum, a construction which has been found to be objectionable because the panels wear much more rapidly at and near the feed end of the drum than at any other portion owing to the large amount of sand and grit which is fed into the drum with the vines and which exercises a rapid cutting or wearing action upon the perforated panels before it escapes through the perforations of the same. I therefore make each of the panels $b$ in the form of a series of sections, the number of which may be governed by the length of the drum. In the present instance each panel consists of three sections and in order to prevent the vines from catching upon the ends of the sections where they join I place at each joint ribs $b^2$, extending from one internal blade $b'$ to the next around the drum and resting upon and, if desired, being secured to the outer bars or ribs $b^3$ of the drum, which bear upon the edges of the panel-sections and retain the same in place. The edges of said sections abut against the ribs $b^2$ and are thereby protected and prevented from catching upon or being torn loose by the vines passing through the drum. The ribs $b^2$ also serve as braces for the blades $b'$ and thus materially strengthen the construction of the drum.

The hulled peas or beans mixed with the fine chaff passing through the perforations of the panels b are received into a hopper F, located beneath the drum B, and are discharged from said hopper through an opening d, the area of which can be regulated by means of an adjustable gate f on the face of the hopper, a shaft g having pins or other suitable projections thereon rotating close to the bottom of the hopper, so as to insure the passage of the peas through the outlet-opening in a substantially uniform stream. A curtain or apron F' extends from the top of the hopper to the top of the frame A so as to prevent the escape of any peas or beans over the top of the hopper. On escaping from the hopper the peas or beans enter a chute G, which is inclined downwardly and forwardly toward a drum H, the latter being caused to rotate in the direction of the arrow, Fig. 2—that is to say, in a direction toward the forwardly-projecting lower end of the chute G. The mixture of the peas or beans and chaff is therefore discharged from the chute G onto a surface moving toward the stream, and the fine chaff will be carried forward by said moving surface, but the peas or beans, owing to their comparative elasticity, will rebound from the surface of the drum and will retain substantially the direction of movement given them by their descent of the chute G. Hence the drum will exercise no material directing influence on the peas or beans, which will roll or bound from the surface of the drum into the receptacle H', suitably located in front of the drum, the chaff being carried around to a point behind the drum and being thrown down upon the floor or into a receptacle suitably located to receive it.

A brush or scraper p may be located at the rear of the drum in order to prevent the chaff from adhering to and coating said drum.

The hopper F is mounted upon a fixed frame F' by means of slotted arms i and bolts i', so that said hopper can be properly adjusted in respect to the drum H, and the chute G is pivotally hung to the hopper F and has an arm m slotted for the reception of a securing-bolt m' on the hopper, so that the angle of said chute can be altered in order to best adapt it for performing its intended work under different circumstances.

There is at one end of the drum H a pulley n for the reception of a belt running to a pulley n' at the end of the stirring or agitating shaft g of the hopper, so that the latter is driven in unison with the drum. The stirrer may, however, be dispensed with in some cases, and the hopper F may also be mounted directly upon the frame A, if desired, instead of upon a special frame.

In order to prevent entanglement of the vines and trash at the discharge end of the machine with the shaft which carries the beater-drum D, without the necessity of carrying said drum outward beyond the escaping mass of vines and trash, I form on the end of the polygonal drum a circular rim s and mount upon the end frame A at the discharge end of the machine a segmental plate s' fitting at its inner edge with comparative snugness to said circular band s of the beater-drum and extending outward to a point close to the inner edge of the end ring of the outer drum B.

Partitions t extend from the edges of this segmental plate s' outward through the frame A to the outer casing w which covers all that portion of the frame above the shaft-bearing, these partitions being such that in connection with the circular band s of the beater-drum and the segmental plate s' that portion of the shaft of the beater-drum which extends from the end of said drum to the bearing on the cross-bar $A^2$ of the frame is completely inclosed from above and from each side, so that it is impossible for vines or trash to gain access thereto and wind upon or clog the same.

Having thus described my invention, I claim and desire to secure by Letters Patent—

1. In a machine for hulling green peas or beans with the vines, or a portion thereof attached, a hulling cylinder or drum consisting of a series of perforated or open-work panels each consisting of a series of longitudinal sections, internally-projecting longitudinal blades and ribs extending transversely between the blades and serving to protect the joints between the sections of the perforated panels, substantially as specified.

2. In apparatus for separating hulled green peas or beans from chaff, the combination of a hopper, a rotating drum and an interposed directing-chute provided with adjusting devices whereby its angle can be changed, substantially as specified.

3. In a machine for hulling green peas or beans with the vines or a portion thereof attached, the combination of the delivery end of an outer rotating drum with an inner rotating beater having a shaft adapted to bearings on the fixed frame, a circular band at the end of said beater, a segmental plate closing the delivery end of the main drum above the beater-shaft, and partitions extending outward from the opposite ends of said segmental plate so as to prevent access of the vines or trash to the beater-drum shaft, substantially as specified.

In testimony whereof I have signed my name to this specification in the presence of two subscribing witnesses.

HARRY H. BRAKELEY.

Witnesses:
H. L. McGALLIARD,
SAMUEL E. BURR.